(12) United States Patent
Annic (10) Patent No.: US 7,558,233 B2
(45) Date of Patent: Jul. 7, 2009

(54) SYSTEM AND METHOD FOR MANAGING ACCESS OF A COMMUNICATION NETWORK TO A MOBILE TERMINAL

(75) Inventor: Etienne Annic, Rambouillet (FR)

(73) Assignee: Orange France, Montrouge (FR)

( * ) Notice: Subject to any disclaimer, the term of this patent is extended or adjusted under 35 U.S.C. 154(b) by 380 days.

(21) Appl. No.: 10/533,191

(22) PCT Filed: Oct. 24, 2003

(86) PCT No.: PCT/FR03/03176

§ 371 (c)(1),
(2), (4) Date: Apr. 27, 2005

(87) PCT Pub. No.: WO2004/043093

PCT Pub. Date: May 21, 2004

(65) Prior Publication Data

US 2006/0013157 A1    Jan. 19, 2006

(30) Foreign Application Priority Data

Oct. 31, 2002    (FR)    .................................... 02 13701

(51) Int. Cl.
*H04W 4/00*    (2009.01)
(52) U.S. Cl. ........................ 370/328; 370/329; 455/418; 455/422.1; 455/432.1; 455/433; 455/435.1; 455/435.2; 455/455; 709/217; 709/245

(58) Field of Classification Search ................. 455/418, 455/422.1, 432.1, 433, 435.1, 435.2, 455; 370/328, 329; 709/217, 245
See application file for complete search history.

(56) References Cited

U.S. PATENT DOCUMENTS 5,414,750 A * 5/1995 Bhagat et al. ................ 455/416

(Continued)

FOREIGN PATENT DOCUMENTS

DE    100 24 861 A1    11/2001

(Continued)

OTHER PUBLICATIONS

"Digital cellular telecommunications system (Phase 2+) (GSM); Universal Mobile Telecommunications System (UMTS); General Packet Radio Service (GPRS) Service Description; Stage 2 (3GPP TS 23.060 version 3.8.0 Release 1999)", ETSI TS 123 060, V3.8.0, Jun. 1, 2001, pp. 134-135.

*Primary Examiner*—Stephen M D'Agosta
(74) *Attorney, Agent, or Firm*—Cohen Pontani Lieberman & Pavane LLP (57) ABSTRACT

A system for managing access from a plurality of communications networks (20, 21, 22) to a mobile terminal (10) connected to a mobile telecommunications network. The system is adapted to set up a connection from at least one of the communications networks (20, 21, 22) to the mobile terminal (10). Application to mobile telecommunications networks enabling access from a mobile terminal (10) to a plurality of independent communications networks (20, 21, 22) each offering a set of services.

20 Claims, 2 Drawing Sheets

U.S. PATENT DOCUMENTS

| | | | | |
|---|---|---|---|---|
| 5,884,172 | A * | 3/1999 | Sawyer | 455/435.1 |
| 5,978,669 | A * | 11/1999 | Sanmugam | 455/410 |
| 6,654,607 | B1 * | 11/2003 | Shobatake et al. | 455/433 |
| 6,665,534 | B1 * | 12/2003 | Conklin et al. | 455/417 |
| 6,961,322 | B2 * | 11/2005 | Viola et al. | 370/328 |
| 2003/0026232 | A1 * | 2/2003 | Uskela | 370/341 |
| 2004/0127237 | A1 * | 7/2004 | Hurtta | 455/466 |

FOREIGN PATENT DOCUMENTS

| | | | |
|---|---|---|---|
| GB | 2 366 705 A | | 3/2002 |
| GB | 2366705 | * | 3/2002 |
| WO | WO 00/78080 A1 | | 12/2000 |

* cited by examiner

Fig. 1

SYSTEM AND METHOD FOR MANAGING ACCESS OF A COMMUNICATION NETWORK TO A MOBILE TERMINAL

RELATED APPLICATION

This is a U.S. National Phase Application under 35 USC 371 of International Application PCT/FR2003/003176, filed 24 Oct. 2003.

This patent application claims priority of French patent application no. 02 13701 filed on 31 Oct. 2002, the disclosure of which is hereby incorporated by reference.

FIELD OF THE INVENTION

The present invention relates to a system and a method for managing access to a mobile terminal from a communications network.

The invention applies more particularly to mobile networks allowing access to a mobile terminal from a plurality of independent communications networks, each offering a set of services.

BACKGROUND OF THE INVENTION

At present, such services are accessible from a mobile terminal connected to mobile telecommunications networks such as General Packet Radio Service (GPRS) and Universal Mobile Telecommunications system (UMTS) networks.

At present, in such mobile networks, the user can select a communications network offering services by selecting a name identifying that communications network. To set up a connection between a mobile terminal and a particular communications network, that name is sent over the mobile network to an equipment managing access to the communications networks.

To facilitate the explanation of the invention, the description uses GPRS and UMTS terminology. However, the invention applies to all communications systems using identical techniques for identifying and addressing a communications network.

In existing systems of the GPRS and UMTS types, the name identifying a communications network is called its access point name (APN). In these systems, the equipment supporting services is known as a Serving GPRS Support Node (SGSN) and the equipment managing access to the communications networks is called the Gateway GPRS Service Node (GGSN).

An APN primarily comprises an identifier of the selected communications network, an identifier of the operator managing that communications network, and an identifier of the mobile network technology, for example the GPRS or UMTS technology. The format and use of access point names APN are covered by standards issued by the European Telecommunications Standards Institute (ETSI).

One function of an SGSN is to receive an APN from a mobile terminal and to forward it for recognition to the APN server to which it is connected. That APN server responds to the SGSN by sending a list of the GGSN associated with the APN. The SGSN sets up a connection to a GGSN from this list. One function of a GGSN is to recognize an APN received from a mobile terminal and to set up a connection to a communications network corresponding to that APN. The SGSN and the GGSN are also covered by standards issued by the ETSI.

Once an APN has been selected on the mobile terminal, an access protocol is started. In the case of the GPRS or the UMTS, this protocol is the Packet Data Protocol (PDP). A procedure for setting up a connection from the mobile terminal to the GGSN is executed. To enable the connection to be set up, a link to the selected communications network is created via the mobile network. In the case of the GPRS or the UMTS, this link is called a PDP context link. It provides access from the mobile terminal to all the services of the communications network.

On completion of the above procedure, the terminal receives from the communications network with which a connection has been set up an address that identifies the terminal within that communications network. It is associated with the PDP context link between the terminal and the communications network.

By analogy with fixed network telephony and Global System for Mobile communications (GSM) systems, the connection request from a mobile terminal to a communications network is referred to as an outgoing call request.

Similarly, a connection request from a communications network to a mobile terminal is referred to as an incoming call request.

At present, GPRS and UMTS mobile telecommunications network operators do not allow a connection to be set up from the communications network to the mobile terminal.

At present a connection between a mobile terminal and a communications network can be established only from the mobile terminal to the communications network.

SUMMARY OF THE INVENTION

One object of the present invention is to provide a system and a method for managing access from a plurality of communications networks to a mobile terminal connected to a mobile telecommunications network that remedies the drawbacks of existing systems by providing an incoming call request to a mobile terminal.

This and other objects are attained in accordance with one aspect of the present invention directed to a system for managing access from a plurality of communications networks to a mobile terminal connected to a mobile telecommunications network. The system is adapted to set up at least one connection from at least one of the communications networks to the mobile terminal after said mobile terminal has been identified in at least one address assignment server (or Radius) to which the communications network is going to establish the connection, after checking the existence of a user address of the mobile terminal, after verifying the accessibility to the mobile communications network, and after verifying the authorization for receiving incoming calls given by the user of the mobile terminal identified for accessing the communications network.

At present a connection is set up from a mobile terminal to a communications network via a GGSN.

Equipments similar to that used for an outgoing call request as described above are used to set up a connection between a mobile terminal and a communications network.

A PDP context link is created from the communications network to that particular mobile terminal via the mobile telephone network. The mobile terminal receives from the communications network with which the connection has been set up an address that identifies a terminal within the communications network. That address is associated with the PDP context link between the terminal and the communications network.

According to an embodiment of the invention, the access management system allows a connection from a communications network to a particular mobile terminal to be set up via interfaces specific to that connection.

According to an embodiment of the invention, said system comprises at least one user address search interface situated in said communications network and adapted to assign a user address to said mobile terminal on the basis of data from a first command message received from at least one domain name server situated in said communications network.

The user address search interface determines the user of the mobile terminal to which the communications network wishes to set up a connection.

The user address is determined from the identifier of the user of the mobile terminal sent via an application server and a domain name server situated in the communications network to which the mobile terminal user is a subscriber.

According to an embodiment of the invention, said system comprises at least one incoming call management interface situated in said communications network and adapted to assign at least one network address to said mobile terminal after processing of said user address on the basis of data from a second command message received from said user address search interface.

The incoming call request management interface identifies the communications network that is to set up a connection to the mobile terminal.

The network address is determined from the user address, by means of data sent by the user address search interface.

According to an embodiment of the invention, said system comprises at least one access control interface situated in said communications network and adapted to verify said user address of said mobile terminal on the basis of data from a third command message received from said incoming call request management interface.

The ETSI standard provides that a plurality of connections may be set up simultaneously between the same mobile terminal and different communications networks.

For example, when a mobile terminal has already been connected to a first communications network by means of an outgoing call request, the first communications network has assigned an address to the mobile terminal. If a second communications network then sets up a connection to the same mobile terminal by means of an incoming call request, the access control interface verifies if the user address corresponding to the mobile terminal exists already.

According to an embodiment of the invention, said system comprises at least one access authorization interface situated in said mobile telecommunications network and adapted to verify said network address after processing of said user address of said mobile terminal on the basis of data from a fourth command message received from said access control interface.

In a mobile telecommunications network, because a request for an outgoing call from a mobile terminal is sent by the mobile terminal, addressing is managed by a home location register (HLR).

A request for an incoming call to a mobile terminal is sent by the communications network, and addressing is managed by a GGSN. Thus addressing is managed by different equipments of the mobile telecommunications network, depending on the type of call request (outgoing or incoming).

The access control interface situated in the communications network allows communication with the mobile telecommunications network to which the user of the mobile terminal is connected via the access authorization interface that is connected to the home location register.

Another aspect of the invention is directed to a method of managing access from a plurality of communications networks to a mobile terminal connected to a mobile telecommunications network. At least one identifier corresponding to a mobile terminal is stored in at least one application server of one of the communications networks. A first command message to request identification of the mobile terminal is sent from the application server to at least one domain name server of the communications network. The first command message is sent from the domain name server to at least one user address search interface of the communications network to assign at least one user address to the mobile terminal. A second command message for assigning a network address with the user address of the mobile terminal is sent from the user address search interface to at least one incoming call request management interface of the communications network. The existence of the received user address in the call request management interface connected to at least one network address assignment server, when the user address exists, is checked. The incoming call request management interface sends a message to advise the existence of the address to the user address search interface. A fourth command message to process the user address is sent from the access control interface to at least one access authorization interface situated in the mobile telecommunications network. The accessibility to the mobile telecommunications network is verified. Also verified is the authorization for receiving incoming calls given by the user of the mobile terminal in at least one home location register of the mobile telecommunications network connected to the access authorization interface. The accessibility and the authorization of the user of the mobile terminal are sent from the access authorization interface situated in the telecommunications network to the access control interface situated in the communications network, for formatting the data. The accessibility and the authorization of the user of the mobile terminal are sent from the access control interface to the incoming call request management interface via the network address assignment server of the communications network for analysis. A connection is set up from the communications network to the mobile terminal to send at least one data item with the user address.

If the mobile terminal is able to manage a plurality of connections, a first address is assigned for an outgoing call request and a second address is assigned for an incoming call request. If the outgoing call request and the incoming call request are set up between a mobile terminal and the same communications network, the mobile terminal may be assigned two addresses by a single communications network.

In this case, the assignment of a second address to the mobile terminal is unnecessary, because it already has a first address assigned by the same communications network. Because there is currently a shortfall in available addresses, this duplicate addressing is a waste of addressing resources, the quantity of which is obviously limited.

The incoming call request management interface connected to the network address assignment server of the communications network prevents the mobile terminal being assigned two addresses.

According to an embodiment of the invention, said access management method includes the steps of: sending a fourth command message to process said user address from said access control interface to at least one access authorization interface situated in said mobile telecommunications network, verifying said accessibility and said rights of said user of said mobile terminal in at least one home location register of said mobile telecommunications network connected to said access authorization interface, sending said accessibility and said rights of said user of said mobile terminal from said access authorization interface situated in said telecommunications network to said access control interface situated in said communications network, for formatting the data, and sending said accessibility and said rights of said user of said mobile terminal from said access control interface to said incoming call request management interface for analysis.

At present there exist mobile terminals that are able to manage only one connection to a communications network at a time. They can receive only one address associated with a PDP context link at a time, coming from a single communications network.

In this case, after an outgoing call request, an incoming call request from the communications network cannot be connected through. Consequently, the user's rights do not allow an incoming call request.

Moreover, if the mobile terminal is able to manage a plurality of connections, the user of the mobile terminal may opt not to allow an incoming call request coming from one of the communications networks, for example to prevent receiving advertising messages broadcast by a particular communications network.

According to an embodiment of the invention, in the event of non-accessibility or of absence of rights for said user of said mobile terminal, said incoming call request management interface sends a first failure message to said user address search interface, after which said user address search interface forwards said first failure message to said domain name server and to said application server for processing, so as not to set up the connection between said communications network and said mobile terminal.

The interfaces specific to a connection by means of an incoming call request dialogue with the servers of the communications network to send the data necessary for access management.

If setting up the connection is not allowed, failure messages are exchanged between the equipments of the communications network.

According to an embodiment of the invention, the access management method includes the following steps: sending said user address from said user address search interface to said domain name server and thence to said application server, and sending data with said user address from said application server to at least one access management equipment of said mobile telecommunications network.

According to an embodiment of the invention, in the event of recognition of said user address, said access management equipment sends said data to at least one server support equipment, and thence to said mobile terminal, after the connection is set up between said communications network and said mobile terminal.

When all the checks carried out by the interfaces by means of the servers of the communications network have been completed, the network address corresponding to the mobile terminal is sent to the access management equipment in the mobile telecommunications network.

The incoming call request is then authorized and a connection is set up from the communications network to the mobile terminal, which receives data from the communications network.

DETAILED DESCRIPTION OF THE DRAWINGS

To simplify the description, the equipment connected to the mobile telecommunications network is shown as a mobile terminal 10, but this equipment may be of various kinds, for example a server, a mobile communications terminal or a personal computer (PC).

Figure 1:
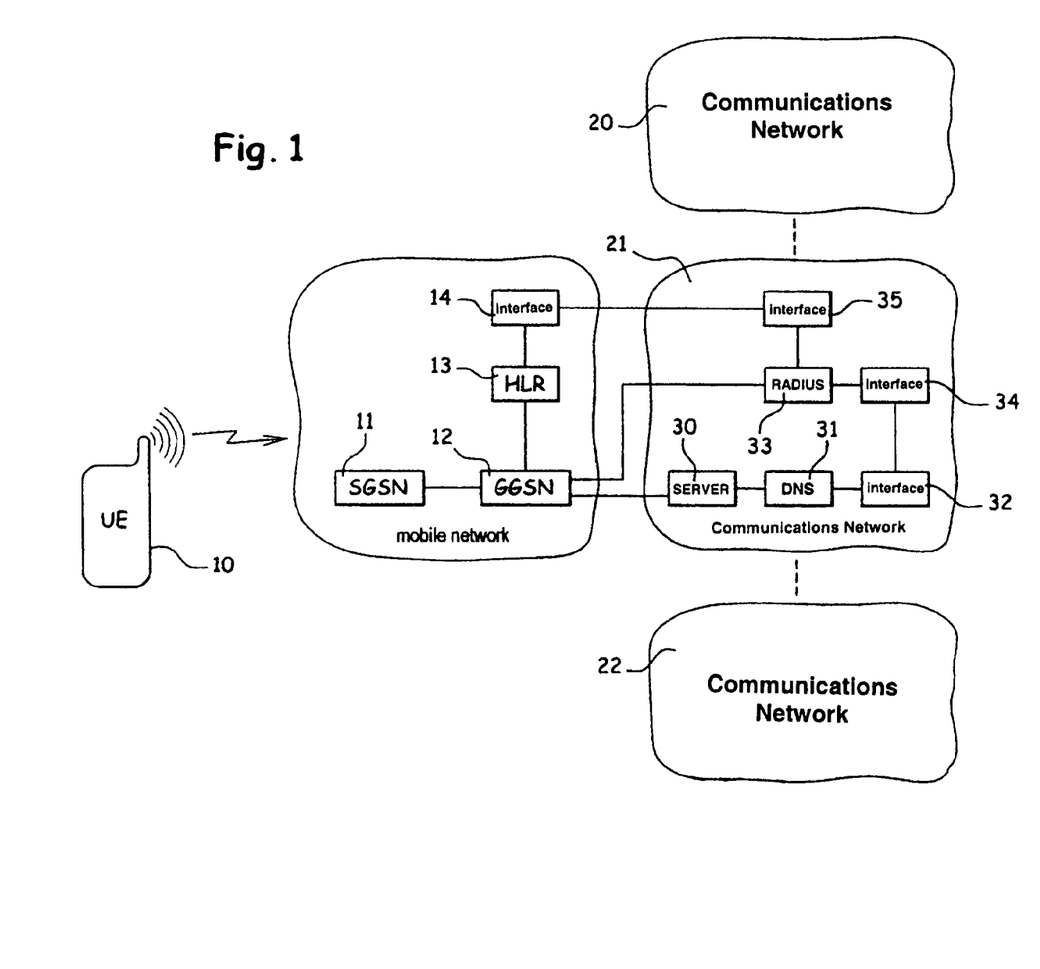
FIG. 1 is a diagram of the general architecture of a system in accordance with an embodiment of the invention for managing access from a plurality of communications networks to a mobile terminal.

FIG. 1 shows a system for managing access from a plurality of communications networks 20, 21, 22 to a mobile terminal 10 symbolized by a user equipment (UE) 10.

Whatever kind of mobile terminal 10 is used, it is connected to a public mobile telecommunications network to which the user is a subscriber.

The invention applies to all the communications networks 20, 21, 22, which all use equivalent techniques to identify and address a mobile terminal 10.

The mobile terminal 10 is connected to any type of mobile telecommunications network allowing packet mode transmission to a mobile terminal 10, for example a General Packet Radio Service (GPRS) mobile network or a Universal Mobile Telecommunications system (UMTS) mobile network.

The user is also a subscriber to a plurality of independent communications networks 20, 21, 22 each offering a set of services. The user stores in his mobile terminal 10 an APN identifying each of the communications networks 20, 21, 22.

When the user of the mobile terminal 10 selects a stored APN, a connection is set up with one of the communications networks 20, 21, 22 via the mobile telecommunications network. The mobile terminal has then set up a connection referred to as an outgoing call to one of the communications networks 20, 21, 22. As indicated above, a respective APN identifies each of the communications networks 20, 21, 22.

The APN is sent to a SGSN connected to an APN server that holds a table of the correspondences between APN and GGSN. A GGSN 12 selected by means of this table sets up a connection to the communications network 20, 21, 22.

In contrast to an outgoing call request, an incoming call request allows a connection to be set up from one of the communications networks 20, 21, 22 to the mobile terminal 10, as explained above.

As shown in FIG. 1, an application server (AS) 30 belonging to one of the communications networks 20, 21, 22 searches for the identifier of the user of the mobile terminal 10 in order to initialize the incoming call request.

A request for an incoming call from a communications network 20, 21, 22 to a mobile terminal 10 can be initialized by various equipments of the communications network 20, 21, 22, for example the application server (AS) 30 or any other equipment of the communications network, for example any terminal, having access to the application server (AS) 30 of the communications network 20, 21, 22.

The application server (AS) 30 uses a domain name server (DNS) 31 in the communications network 20, 21, 22. The domain name server (DNS) 31 triggers processing of the identifier of the user of the mobile terminal 10 by a user address search interface 32.

The user address search interface 32 may be physically located in the domain name server (DNS) 31 or elsewhere.

The user address search interface 32 sends a user address corresponding to the mobile terminal 10 to an incoming call request management interface 34 in the communications network 20, 21, 22. The incoming call request management interface 34 processes the user address to check whether the user address exists already or not.

If the user address corresponding to the mobile terminal 10 exists already, the incoming call request management interface 34 sends the user address back to the user address search interface 32.

If no user address corresponding to the mobile terminal 10 exists already, the incoming call request management interface 34 uses a Remote Authentication Dial-In User Service (RADIUS) server 33 in the communications network 20, 21, 22.

The incoming call request management interface 34 may be physically situated in the RADIUS server 33 or elsewhere.

The RADIUS server 33 uses an access control interface 35 that triggers processing of the network address. The access control interface 35 can also be physically situated in the RADIUS server 33 or elsewhere.

The access control interface 35 assigns a network address that corresponds to the communications network 20, 21, 22 and is sent to an access authorization interface 14 in the mobile telecommunications network.

The access authorization interface 14 uses a home location register (HLR) 13 in the mobile telecommunications network. The access authorization interface 14 may be physically situated in the home location register (HLR) 13 or elsewhere.

The home location register (HLR) 13 verifies the accessibility and user rights of the mobile terminal 10 with respect to an incoming call request sent from the communications network 20, 21, 22.

As a function of the result of this verification, the access authorization interface 14 responds to the access control interface 35, which sends to the incoming call request management interface 34, authorizing the incoming call request or not.

If the incoming call request is not authorized, the processing is terminated and no connection is set up between the communications network 20, 21, 22 and the mobile terminal 10.

If the incoming call request is authorized, the call request management interface 34 assigns a network address to the mobile terminal 10 that is sent to the user address search interface 32.

The user address search interface 32 assigns a user address corresponding to the mobile terminal 10 that is sent to the domain name server (DNS) 31 and thence to the application server (AS) 30.

The application server (AS) 30 uses a GGSN 12 connected to the SGSN 11 of the mobile communications network to which the mobile terminal 10 is connected.

The connection corresponding to the incoming call request is set up between one of the communications networks 20, 21, 22 and the mobile terminal 10.

Figure 2:
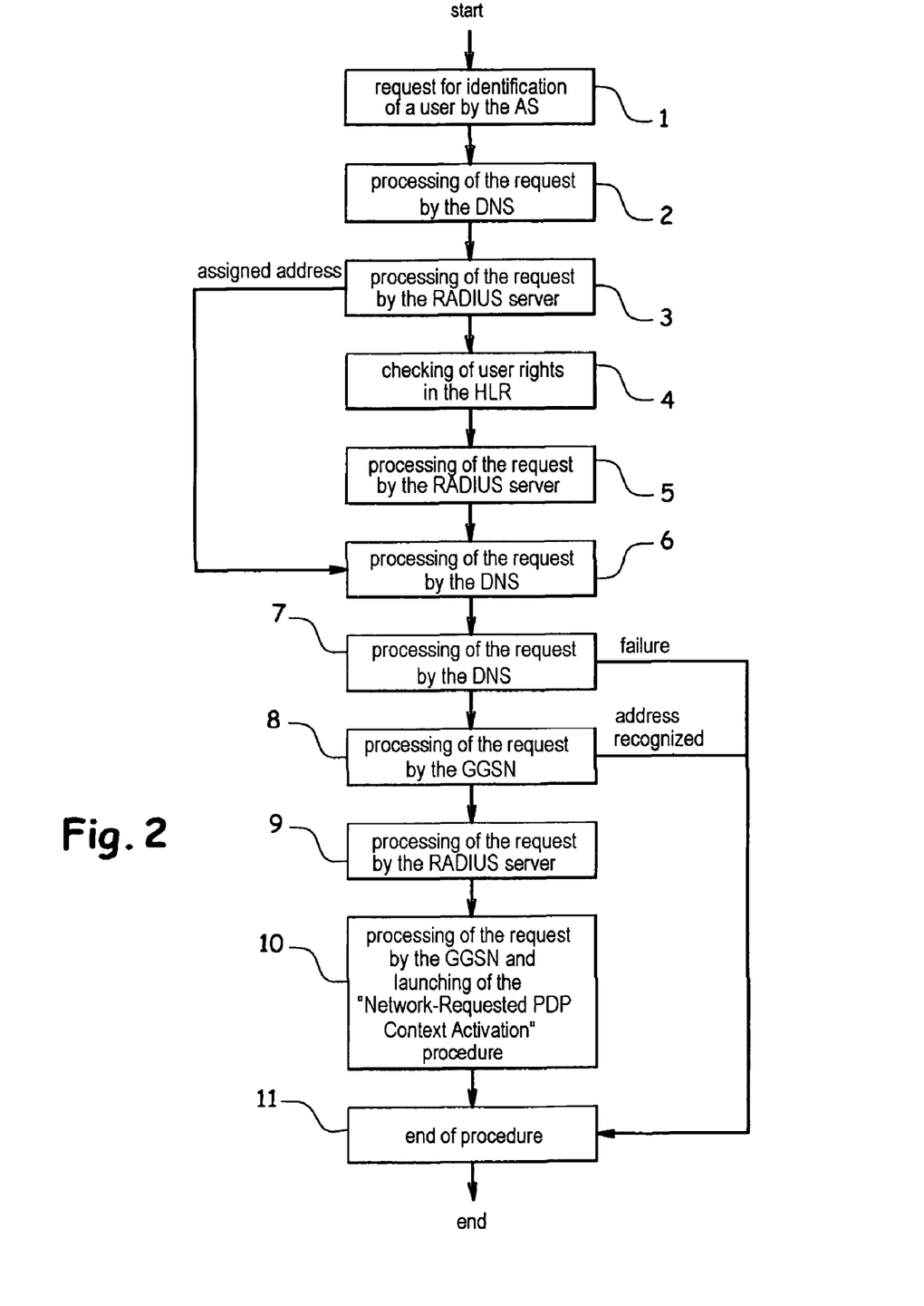
FIG. 2 represents the steps of a method in accordance with an embodiment of the invention of managing access from a communications network to a mobile terminal.

To assist the explanation of the invention, FIG. 2 shows the steps of the method of managing access from a communications network to a mobile terminal.

The user of the mobile terminal 10 is identified in each of the equipments of the communications network 20, 21, 22 in various ways. For example, a user identifier may correspond to the name and forename of the user, in the form "name.forename", or take the form "0607080910.communicationsnetwork", corresponding to a number identifying the user and an identifier of the communications network 20, 21, 22 concerned.

To facilitate the following explanations, the user identification is in the form used for Internet Protocol (IP) addresses. However, any form of addressing offering similar user identification functions is compatible with the invention.

An application server (AS) 30 of the communications network 20, 21, 22 accesses the identifier of the user of the mobile terminal 10 that is the destination of the incoming call request (step 1).

Regardless of the form of identifier already existing in the communications network 20, 21, 22, in the application server (AS) 30 the user identifier is "user AS id".

The application server (AS) 30 sends a "user AS id, command" command message to a domain name server (DNS) 31 of the communications network 20, 21, 22, this message corresponding to a request for identification of the user of the mobile terminal 10.

The transmission protocol for assigning an address used between an application server (AS) 30 and a domain name server (DNS) 31 is defined by the Internet Engineering Task Force (IETF); it is the DNS protocol, for example.

The domain name server (DNS) 31 sends the command message to a user address search interface 32 for processing (step 2).

Regardless of the form in which the identifier exists already, in the domain name server (DNS) 31 the identifier is "user DNS id", and corresponds to the user referred to in the "user AS id, command" command message.

To find out the "user DNS id" identifier, the user address search interface 32 can either access a table of the correspondences between "user AS id" identifiers and "user DNS id" identifiers or construct the identifier from the identifier in the "user AS id, command" message received from the application server (AS) 30.

The user address search interface 32, which is connected to the domain name server (DNS) 31, sends a "user DNS id, command" command message to an incoming call request management interface 34 connected to a network address assignment (RADIUS) server 33 to carry out the processing of the user address (step 3).

The transmission protocol used to assign an address between a user address search interface 32 connected to a domain name server (DNS) 31 and an incoming call request management interface 34 connected to a network address assignment (RADIUS) server 33, for example the DNS protocol or the RADIUS protocol, is defined by the Internet Engineering Task Force (IETF).

Regardless of the format in which it exists already, in the network address assignment (RADIUS) server 33 the user identifier is "user network id", and corresponds to the user referred to in the "user DNS id, command" command message.

To find out the "user network id" identifier, the incoming call request management interface 34 can either access a table of the correspondences between "user DNS id" identifiers and "user network id" identifiers or construct the identifier from the identifier in the "user DNS id, command" command message received from the user address search interface 32 connected to the domain name server (DNS) 31.

To avoid assigning a second address corresponding to the same user of the mobile terminal 10, the incoming call request management interface 34 connected to the network address assignment (RADIUS) server 33 checks whether an address has already been assigned to the user referred to in the "user DNS id, command" message.

If the mobile terminal 10 of the user has already set up a connection with the communications network 20, 21, 22, a first address corresponding to the user has already been assigned. An address corresponding to the user therefore exists in the incoming call request management interface 34 connected to the network address assignment (RADIUS) server 33.

The incoming call request management interface 34 connected to the network address assignment (RADIUS) server 33 sends a "user DNS id, IP address" message to the user address search interface 32 connected to the domain name server (DNS) 31. In this case, steps 4 and 5 of the method of the invention described below are not carried out.

If there is no address corresponding to the user of the mobile terminal 10, the incoming call request management interface 34 sends a "user network id, APN, command" command message to the network address assignment (RADIUS) server 33, which directs the "user network id, APN, command" command message to an access control interface 35 to carry out the processing corresponding to the network and to the user.

The accessibility and the rights of the user of the mobile terminal 10 are stored in the home location register (HLR) 13 of the mobile telecommunications network to which the user is a subscriber. Consequently, the access control interface 35 connected to the network address assignment (RADIUS) server 33 sends the command message to an interface 14 for authorizing access from the mobile telecommunications network.

The access authorization interface 14 sends the command message to a home location register (HLR) 13 of the mobile telecommunications network (step 4).

The home location register (HLR) 13 verifies the accessibility and rights of the user with regard to an incoming call request sent by the communications network 20, 21, 22 identified by an APN and to which the network address assignment (RADIUS) server 33, the domain name server (DNS) 31 and the application server (AS) 30 all belong.

The transmission protocol used to assign an address between an access control interface 35 connected to a network address assignment (RADIUS) server 33 and an access authorization interface 14 connected to an home location register (HLR) 13 is defined either by the IETF, for example the RADIUS protocol or the DIAMETER protocol, or by the European Telecommunications Standards Institute (ETSI), for example the Mobile Application Part (MAP) protocol that is specific to mobile telecommunications networks managed by an operator.

The accessibility of the user corresponds to the possibility of setting up a connection with the mobile terminal 10 of the user, for example whether the mobile terminal is recognized by the mobile telecommunications network. The rights of the user correspond to the existence of a subscription or of authorization by the user of incoming call requests received from the communications network 20, 21, 22 concerned.

The home location register (HLR) 13 sends a "user network id, user accessibility, user authorization" message to the access authorization interface 14.

The home location register (HLR) 13 can also insert into this message the address of the SGSN 11 that is available for setting up a connection from the communications network 20, 21, 22 to the mobile terminal 10 of the user.

When the accessibility and rights of the user of the mobile terminal have been added to the message, the access authorization interface 14 sends it to the access control interface 35 connected to the network address assignment (RADIUS) server 33 of the communications network 20, 21, 22, 23.

As mentioned above, the transmission protocol used between an access authorization interface 14 connected to a home location register (HLR) 13 and an access control interface 35 connected to a network address assignment (RADIUS) server 33 is the RADIUS protocol, the DIAMETER protocol or the MAP protocol, for example.

The network address assignment (RADIUS) server 33 receives the message from the home location register (HLR) 13 (step 5).

If the "user accessibility" item of the message indicates that the user is not present on the mobile telecommunications network or if the "user authorization" item indicates that the user has opted not to receive incoming call requests coming from the communications network concerned and identified by the APN, the incoming call request management interface 34 connected to the network address assignment (RADIUS) server 33 sends a "user DNS id, failure cause" message to the user address search interface 32 connected to the domain name server (DNS) 31 that indicates the reason for failure to set up the connection to the mobile terminal 10 of the user.

In the contrary situation, the incoming call request management interface 34 uses the network address assignment (RADIUS) server 33 to assign an address to the user for the connection to the communications network 20, 21, 22.

The incoming call request management interface 34 connected to the network address assignment (RADIUS) server 33 sends a "user DNS id, IP address" message to the user address search interface 32 connected to the domain name server (DNS) 31.

As mentioned above, the transmission protocol used between an incoming call request management interface 34 connected to a network address assignment (RADIUS) server 33 and a user address search interface 32 connected to a domain name server (DNS) 31 is the DNS protocol or the RADIUS protocol, for example.

The domain name server (DNS) 31 receives the message coming from the network address assignment (RADIUS) server 33 (step 6).

If the message coming from the network address assignment (RADIUS) server 33 is a "user DNS id, failure cause" message, the domain name server (DNS) 31 sends a "user AS id, failure cause" message to the application server (AS) 30 that indicates the reason for failure to set up the connection to the mobile terminal 10 of the user.

If the message coming from the incoming call request management interface 34 is a "user DNS id, IP address" message, the domain name server (DNS) 31 sends a "user AS id, IP address" message to the application server (AS) 30 that indicates the IP address received.

The application server (AS) 30 receives the message from the domain name server (DNS) 31 (step 7).

If the message from the domain name server (DNS) 31 is a "user AS id, failure cause" message, the next step of the method of the invention terminates the processing (step 11). Consequently, no connection is set up by the application server (AS) 30. In this case, the steps 8 to 10 described below are not carried out.

If the message from the domain name server (DNS) is a "user AS id, IP address" message, the application server (AS) 30 sends a GGSN 12 a data packet intended for the mobile terminal 10 of the user, giving the IP address received as the destination address of the data packet.

In the mobile telecommunications network, the GGSN 12 receives the data packet with the IP address from the application server (AS) 30 (step 8).

If the IP address is recognized as having been assigned to a user of the mobile terminal 10 by the GGSN 12, the next step of the method of the invention terminates the processing (step 11).

The GGSN 12 sends the data packet to the mobile terminal 10 of the user via the SGSN 11 of the mobile telecommunications network. The connection corresponding to the incoming call request is then set up between the communications network 20, 21, 22 and the mobile terminal 10 of the user.

If the IP address is not recognized as having been assigned to a user of the mobile terminal 10, the GGSN 12 sends an "IP address, command" command message to the network address assignment (RADIUS) server 33 to request verification of assignment of the IP address to a user.

As mentioned above, the transmission protocol used between a network address assignment (RADIUS) server 33 and a GGSN 12 is the RADIUS protocol or the DIAMETER protocol, for example.

The network address assignment (RADIUS) server 33 receives the command message from the GGSN 12 (step 9). The network address assignment (RADIUS) server 33 checks to which user the IP address has been assigned.

If the IP address has not been assigned, the network address assignment (RADIUS) server 33 sends an "IP address, failure cause" message to the GGSN 12 indicating the reason for failure of the IP address search.

If the IP address has been assigned, the network address assignment (RADIUS) server 33 sends an "IP address, user network id" message to the GGSN 12 that indicates the address assigned to the user.

The network address assignment (RADIUS) server 33 can also insert into the message the address of the SGSN 11 that is available to set up a connection from the communications network 20, 21, 22 to the mobile terminal 10 of the user.

As mentioned above, the transmission protocol used between a network address assignment (RADIUS) server 33 and a GGSN 12 is the RADIUS protocol or the DIAMETER protocol, for example.

The GGSN 12 receives the message from the network address assignment (RADIUS) server 33 (step 10).

If the message from the network address assignment (RADIUS) server 33 is an "IP address, failure cause" message, the next step of the method of the invention terminates the processing (step 11). Consequently, no connection to the mobile terminal 10 is set up by the GGSN 12.

If the message from the network address assignment (RADIUS) server 33 is an "IP address, user network ID" message, the GGSN 12 searches for the address of the SGSN 11 of the mobile telecommunications network that will enable the connection to be set up to the mobile terminal 10.

This search is covered by the ETSI "Network-Requested PDP Context Activation" standard.

The search creates a PDP context link to the mobile terminal 10 by obtaining the "user network id" identifier from the International Mobile Subscriber Identifier (IMSI) of the user in the mobile network, obtaining the IP address assigned to the user from the address of the PDP context link (PDP address), and obtaining the PDP type from the format of the IP address received in the message.

The IMSI, the PDP address and the PDP type are features of the ETSI standard covering the procedure for activating a connection at the request of a communications network.

If the message from the network address assignment (RADIUS) server 33 is an "IP address, user network id, SGSN address" message, the GGSN 12 commands the opening of a connection in the mobile telecommunications network.

The connection command is referred to in the ETSI standard as the Packet Data Unit Notification Request for activating a connection at the request of a communications network (known as Network-Requested PDP Context Activation).

The connection command creates a PDP context link to the mobile terminal 10, obtaining the "user network id" identifier from the user's IMSI, obtaining the IP address from the PDP address, obtaining the address of the SGSN 11 from the SGSN address of the message, and obtaining the PDP type from the format of the IP address received in the message.

The IMSI, the PDP address, the SGSN address and the PDP type are referred to in the ETSI standard covering the procedure for activating a connection at the request of a communications network.

The PDP context link having been created, the GGSN 12 sends a data packet to the mobile terminal 10 of the user via the SGSN 11 of the mobile communications network. The connection corresponding to the incoming call request is then set up between the communications network and the mobile terminal 10 of the user.

The invention claimed is:

1. A system for managing access from a plurality of communications networks to a mobile terminal connected to a mobile telecommunications network, the system comprising:

an application server disposed within each of said plural communications networks;

at least one domain server operatively coupled to said application server disposed in each of said plural communications networks, said at least one domain server receiving a first command message sent from the application server to request identification of said mobile terminal;

at least one network address assignment server disposed in each of said plural communications networks;

at least one incoming call request management interface operatively connected to said at least one network address assignment server, said at least one incoming call request management interface receiving a second command for assigning a network address with a user address of said mobile terminal; and at least one home location register located in said mobile telecommunications network;

wherein said system is configured to set up at least one additional connection from at least one of said plural communications networks to said mobile terminal with an incoming call request, after said mobile terminal has sent the first command message to request said identification of said mobile terminal from the application server to said at least one domain name server disposed in a communications network, after said mobile terminal has been identified in said at least one address assignment server to which said communications network will establish said additional connection, after checking to determine whether the user address of said mobile terminal exists in said at least one incoming call request management interface connected to said at least one network address assignment server to prevent assignment of a second address corresponding to the same mobile terminal, after verifying accessibility to said mobile telecommunications network in said at least one home location register of said mobile terminal communications network, and after verifying authorization for receiving incoming calls provided by the user of said mobile terminal identified for accessing said communications network.

2. The access management system according to claim 1, further comprising:

at least one user address search interface disposed in said communications network and configured to assign said user address to said mobile terminal, after said check to determine whether the user address exists, based on data from said first command message received from the at least one domain name server disposed in said communications network.

3. The access management system according to claim 2, wherein said at least one incoming call management interface is configured to assign at least one network address to said mobile terminal after processing said user address based on data from said second command message received from said at least one user address search interface.

4. The access management system according to claim 2, wherein said at least one user search address interface comprises means for sending to said at least one domain name server, means for sending to said at least one incoming call request management interface, means for assigning said user address, means for formatting a command message, and means for generating a failure message.

5. The access management system according to claim 1, further comprising:
at least one access authorization interface connected to said at least one home location register of said mobile telecommunications network and configured to verify said at least one network address after processing of said user address of said mobile terminal based on data from a fourth command message received from at least one access control interface.

6. The access management system according to claim 5, wherein said at least one access control interface comprises means for sending to said at least one network address assignment server, means for sending to said at least one access authorization interface, means for verifying said user address of said mobile terminal, means for formatting a command message and means for processing said user address.

7. The access management system according to claim 5, wherein said at least one access authorization interface comprises means for sending to said at least one home location register, means for sending to said at least one access control interface, means for processing said user address, means for verifying said at least one network address, and means for formatting a command message.

8. The access management system according to claim 1, wherein said at least one incoming call request management interface comprises means for sending to said at least one network address assignment server, means for sending to said at least one user address search interface, means for assigning said network address, means for formatting a command message, means for checking the existence of said user address, means for processing a result of verifying the accessibility and rights of said user of said mobile terminal, and means for generating a failure message.

9. A system for managing access from a plurality of communications networks to a mobile terminal connected to a mobile telecommunications network, wherein said system is configured to set up at least one additional connection from at least one of said communications networks to said mobile terminal, the additional connection being set up after said mobile terminal has sent a first command message to request identification of said mobile terminal from an application server to at least one domain name server disposed in said communications network, after said mobile terminal has been identified in at least one network address assignment server to which a communications network will establish said additional connection, after checking to determine whether a user address of said mobile terminal exists in at least one incoming call request management interface connected to said at least one network address assignment server to prevent assignment of a second address corresponding to the same mobile terminal, after verifying accessibility to said mobile telecommunications network in at least one home location register of said mobile terminal communications network, and after verifying authorization for receiving incoming calls provided by the user of said mobile terminal identified for accessing said communications network,
wherein said at least one incoming call management interface is configured to assign at least one network address to said mobile terminal after processing said user address based on data from a second command message received from an user address search interface, said system further comprising:
at least one access control interface connected to said at least one network address assignment server of said communications network and configured to verify said user address of said mobile terminal based on data from a third command message received from said at least one incoming call request management interface.

10. The access management system according to claim 9, further comprising:
at least one access authorization interface connected to said at least one home location register of said mobile telecommunications network and configured to verify said at least one network address after processing of said user address of said mobile terminal based on data from a fourth command message received from said at least one access control interface.

11. The access management system according to claim 10, wherein said at least one access authorization interface comprises means for sending to said at least one home location register, means for sending to said at least one access control interface, means for processing said user address, means for verifying said at least one network address, and means for formatting a command message.

12. The access management system according to claim 9, wherein said at least one access control interface comprises means for sending to said at least one network address assignment server, means for sending to said at least one access authorization interface, means for verifying said user address of said mobile terminal, means for formatting a command message and means for processing said user address.

13. A method of managing access from a plurality of communications networks to a mobile terminal connected to a mobile telecommunications network, comprising the steps of:
storing at least one identifier corresponding to a mobile terminal in at least one application server of one of said plural communications networks;
sending a first command message to request identification of said mobile terminal from said application server to at least one domain name server of said communications network;
sending said first command message from said domain name server to at least one user address search interface of said communications network to assign at least one user address to said mobile terminal;
sending a second command message for assigning a network address with said user address of said mobile terminal from said user address search interface to at least one incoming call request management interface of said communications network;
checking to determine whether the received user address in said call request management interface connected to at least one network address assignment server exists, said incoming call request management interface sending a message to indicate the existence of said address to said user address search interface when said user address exists;
sending a fourth command message to process said user address from said access control interface to at least one access authorization interface disposed in said mobile telecommunications network;

verifying said accessibility to said mobile telecommunications network and said authorization for receiving incoming calls provided by said user of said mobile terminal in at least one home location register of said mobile telecommunications network connected to said access authorization interface;

sending said accessibility and said authorization of said user of said mobile terminal from said access authorization interface disposed in said telecommunications network to said access control interface disposed in said communications network, for formatting said data;

sending said accessibility and said authorization of said user of said mobile terminal from said access control interface to said incoming call request management interface via said network address assignment server of said communications network for analysis; and setting up a connection from said communications network to said mobile terminal to send at least one data item with said user address.

14. The access management method according to claim 13, wherein when said user address does not exist, said incoming call request management interface sends a third command message to said at least one access interface via said network address assignment server of said communications network.

15. The access management method according to claim 13 wherein, in one of an event of non-accessibility and an absence of rights for said user of said mobile terminal, said incoming call request management interface sends a first failure message to said user address search interface, after which said user address search interface forwards said first failure message to said domain name server and to said application server for processing, so as not to set up the connection between said communications network and said mobile terminal.

16. The access management method according to claim 13, wherein, in one of an event of accessibility and an existence of rights for said user of said mobile terminal, said incoming call request management interface sends a user address from said incoming call request management interface to said user address search interface.

17. The access management method according to claim 13, said method further comprising the steps of:

sending said user address from said user address search interface to said domain name server and subsequently to said application server; and sending data with said user address from said application server to at least one access management equipment of said mobile telecommunications network.

18. The access management method according to claim 17 wherein, if said user address is not recognized, said access management equipment sends a fifth command message to said network address assignment server for verification, after which said network address assignment server sends said user address to said incoming call request management interface.

19. The access management method according to claim 17, said method further comprising the steps of:

sending a second failure message from said incoming call request management interface to said network address assignment server and subsequently to said access management equipment if said network address has not been assigned; and processing said second failure message in said access management equipment such that a connection between said communications network and said mobile terminal is not set up.

20. The access management method according to claim 17 wherein, in an event of recognition of said user address, said access management equipment sends said data to at least one service support equipment and subsequently to said mobile terminal after the connection is set up between said communications network and said mobile terminal.

* * * * *